United States Patent
Whang

(10) Patent No.: US 7,089,630 B2
(45) Date of Patent: Aug. 15, 2006

(54) HOT KNOB

(75) Inventor: Andrew Y Whang, Lodi, NJ (US)

(73) Assignee: Cuisine-Cookware Inc., Lodi, NJ (US)

(*) Notice: Subject to any disclaimer, the term of this patent is extended or adjusted under 35 U.S.C. 154(b) by 0 days.

(21) Appl. No.: 10/817,345

(22) Filed: Apr. 2, 2004

(65) Prior Publication Data

US 2005/0241113 A1 Nov. 3, 2005

(51) Int. Cl.
*A45C 13/26* (2006.01)

(52) U.S. Cl. .................... 16/441; 16/433; 220/912; 220/753

(58) Field of Classification Search .......... 16/441, 16/425, 431, 433; 220/753, 62.18, 62.22, 220/912, 215, 396; 126/220, 192; 74/553
See application file for complete search history.

(56) References Cited

U.S. PATENT DOCUMENTS

| 946,271 | A | * | 1/1910 | Reeves | 220/231 |
|---|---|---|---|---|---|
| 2,100,567 | A | * | 11/1937 | Nelson | 16/441 |
| 2,317,349 | A | * | 4/1943 | Wolfers | 220/759 |
| 2,428,894 | A | * | 10/1947 | Serio | 220/231 |
| 2,540,306 | A | * | 2/1951 | Turek | 220/753 |
| 3,343,345 | A | * | 9/1967 | Carolan | 55/511 |
| 3,827,596 | A | * | 8/1974 | Powers, Jr. | 220/231 |
| 4,192,283 | A | * | 3/1980 | Kridler et al. | 126/25 AA |
| 4,451,156 | A | * | 5/1984 | Kloppsteck | 368/10 |
| 5,299,553 | A | * | 4/1994 | Giebel et al. | 126/25 R |
| 5,597,086 | A | * | 1/1997 | King-Shui | 220/592.16 |
| 6,450,361 | B1 | * | 9/2002 | Mendelson et al. | 220/573.1 |
| 6,540,120 | B1 | * | 4/2003 | Lebowitz | 222/471 |

* cited by examiner

*Primary Examiner*—Brian E. Glessner
*Assistant Examiner*—Mark Williams
(74) *Attorney, Agent, or Firm*—Ostrolenk, Faber, Gerb & Soffen, LLP

(57) ABSTRACT

A knob assembly for use with cooking utensils, which includes a hand graspable metallic knob, a metallic bezel for the knob, a first heat insulating separator between the knob and the bezel and a second heat separator between the bezel and the cooking utensil to which the knob assembly is to be attached. The double heat insulators prevent the conduction, as well as radiation of heat, from the hot surface of the cooking utensil to the bezel and from the bezel to the metallic knob. When the assembly is tightened together, only the metallic knob and the bezel are visible and accessible, allowing for easier cleaning of the knob and for maintaining improved hygienic conditions.

15 Claims, 2 Drawing Sheets

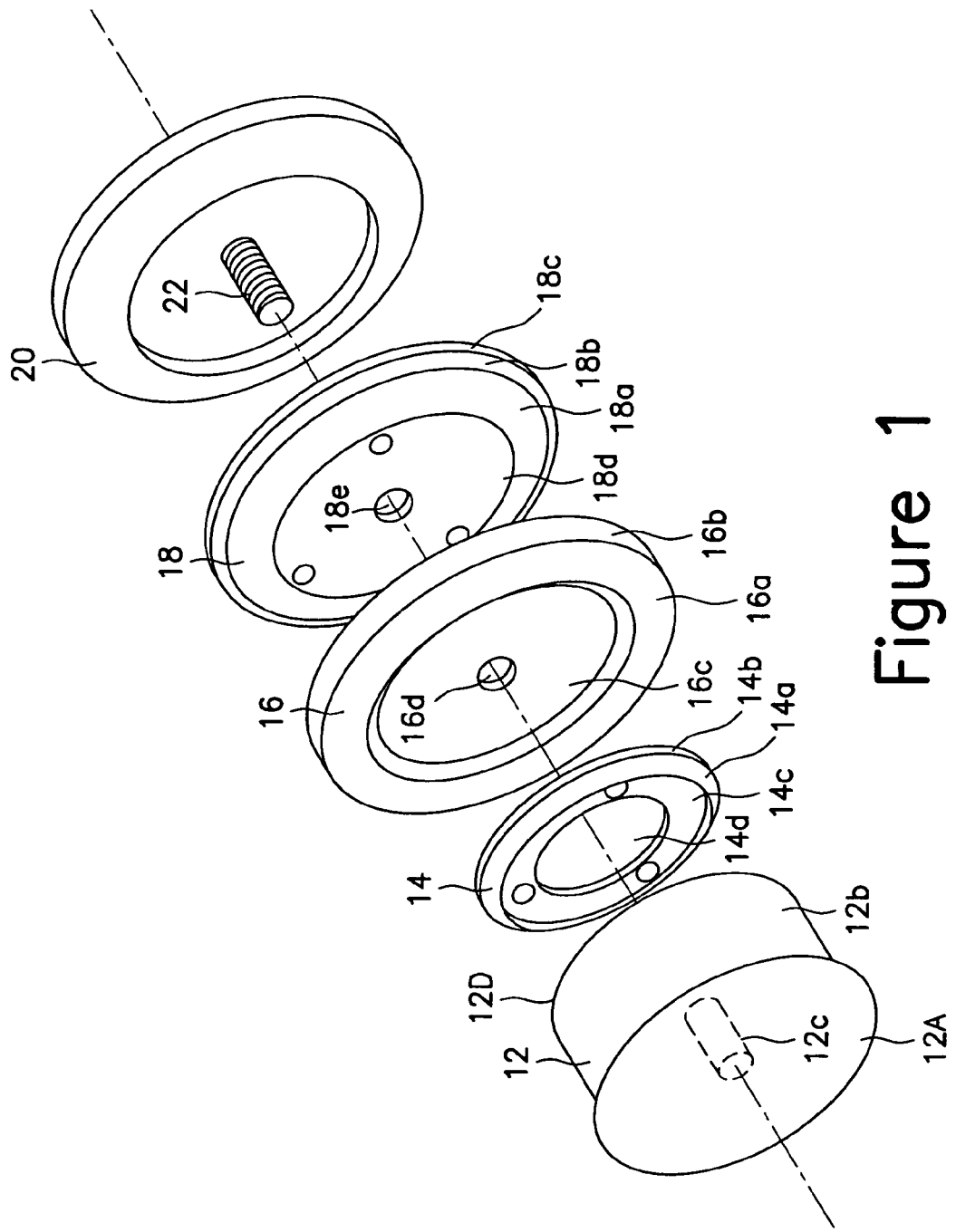

HOT KNOB

BACKGROUND OF THE INVENTION

The present invention relates to knobs generally and, more specifically, to a metallic knob assembly for attachment to pot lids and/or to other hot bodied utensils.

Often one needs to grasp the knob or holding member of a hot utensil, for example, of a pot lid. To avoid scolding of the fingers of a user who accidentally might forget to use an insulating cuff or the like, it is common to construct the part of the knob that is touched by hand from a synthetic material, e.g. nylon.

However, synthetic materials are not as hygienic nor as conductive to cleaning as knobs made of metal. Metallic materials, on the other hand, are excellent heat conductors and therefore best avoided for knobs that are used with hot utensils, to avoid injury.

SUMMARY OF THE INVENTION

Accordingly, it is a general object of the present invention to provide a knob assembly in which the hand graspable portion and the other externally accessible parts are made of an easy clean metal.

It is a further object of the present invention to provide a knob assembly whose external graspable part is insulated from the heat of the utensil to which the knob assembly is attached.

Yet another object of the invention is to provide a metallic knob for pot lids that insulates the knob from the heat of the pot and which is still simple and inexpensive to manufacture and assemble.

The foregoing and other objects of the invention are realized with a knob assembly that is suited for use with hot cooking utensils and which comprises four major components, including a hand graspable metallic knob, a metallic bezel for the knob, a first heat insulating separator located between the knob and the bezel and a second heat insulating separator between the bezel and the cooking utensils to which the knob assembly is to be attached.

Preferably, the first and second separators are disk-shaped and the first disk includes a ledge on which the knob rests without contacting either the bezel or the cooking utensil. The bezel itself has a footprint of a size larger than the corresponding footprint size of the knob. The bezel also defines a well that is dimensioned to fittingly receive the first disk. A screw assembly interlocks, holds tightly and secures the knob bezel and the two separator disks to the utensil.

When the knob assembly is fully integrated on a cooking utensil, only the knob and the peripheral region of the bezel are visible and, preferably, the interior spaces are protected against seepage of liquids thereinto. The first and second separators are preferably constructed of a synthetic material that retards heat conduction, as well as heat radiation.

Other features and advantages of the present invention will become apparent from the following description of the invention which refers to the accompanying drawings.

BRIEF DESCRIPTION OF THE DRAWINGS

FIG. 1 is an exploded perspective of the knob assembly of the present invention.

DETAILED DESCRIPTION OF THE PREFERRED EMBODIMENTS OF THE INVENTION

Figure 2A:
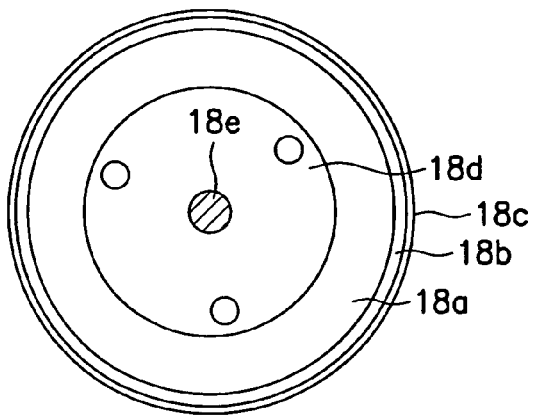
FIGS. 2a through 2c are, respectively, front, rear and side views of the larger sized, heat resistant separator disk of the present invention.

With reference to FIG. 1, the knob assembly 10 of the present invention comprises four main components, including a metallic knob 12, a bezel 16, a first disk-shaped insulating, non-heat conducting separator 14 and a second disk-shaped, insulating, non-heat conducting separator 18.

The knob assembly 10 can be connected to any hot surface, including to a lid 20 of a pot that has an extending screw 22 that can be threaded via central openings in the first and second insulators 14 and 18, respectively, and the bezel 16 into an internally threaded opening 12c formed in a stem, within the knob 12. When fully assembled, the second insulator 18 prevents or at least substantially retards heat flow from the lid 20 to the bezel 16 and the first insulator 14 serves to further prevent or substantially curtail heat flow from the bezel 16 to the metallic knob 12.

Figure 3A:
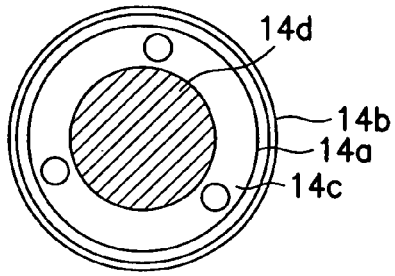
FIGS. 3a through 3c are, respectively, front, rear and side views of the smaller sized disk of the present invention.
Figure 3B:
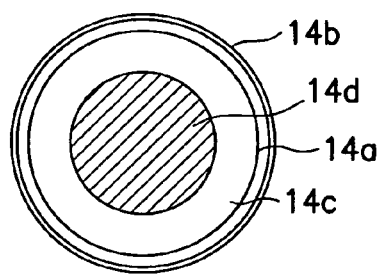
Figure 3C:
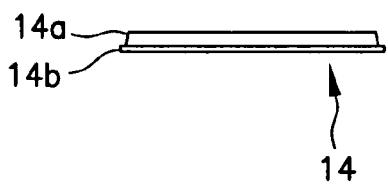

More specifically, the knob 12 comprises a hat portion 12a which is smoothly integrated with a depending skirt 12b with a diameter of the hat 12a being slightly larger than a diameter of the skirt 12b for easier grasping. A round peripheral edge 12d of the knob 12 rests on a tapered/sloping portion 14a of the first insulating disk 14 with the most distal portion thereof preferably touching a ledge 14b, as can be better appreciated from FIG. 3c. The disk-shaped separator 14 has a center hole 14d which is formed in an inwardly dependent well 14c which is receivable within a corresponding well 16c of the bezel 16. Preferably, a diametrical dimensions of the peripheral edge 12d closely matches an outer diameter of the first insulator 14, as well as an internal diameter of the well 16c of the bezel 16. Thus, when the bezel 16, the knob 12 and the intermediate separator 14 are assembled together, only the outlying portion of the bezel 16, which is not covered by the knob 12 is visible.

The bezel 16 itself is coupled to the surface of the lid 20 via the second separator 18 which comprises a sloping surface 18b, with a circumscribing ledge 18c. The bezel 16 contacts the sloping surface 18b and also preferably bears against the ledge 18c to thereby become insulated from the heat of the lid 20. The screw 22 passes through an opening 18e and a well 18d of the second separator 18, and further passes through an opening 16d and the central hole 14d of the bezel 16 and the first insulator 14, respectively, so that when the knob 12 is turned, it tightly contacts the lid 20, holding the assembly firmly together, without any accessibility to the internal first and second separators 14 and 18, respectively.

Figure 2B:
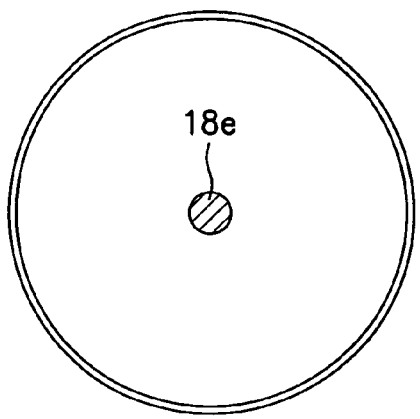
Figure 2C:

Further details of the knob assembly 10 can be seen in FIGS. 2a, 2b and 2c which respectively show a front, rear and side view of the second and larger diameter separator 18. Preferably, an outer diameter of the second separator 18 is about 2.3750 inches and an outer diameter of the smaller separator 14 is 1.4375 inches. The smaller separator 14 is depicted via front, rear and side views thereof in FIGS. 3a, 3b and 3c, respectively.

The bezel 16, as well as the knob 12, are preferably constructed of metal and furthermore, preferably of a brightly colored metal. Preferably, the second separator 18 is substantially solid and makes contact with the bezel 16 only around a periphery thereof, thereby preventing not only the flowing of heat, but also radiation of heat to the bezel 16. In other words, the outer diameters of the bezel 16 and the second separator 18 are approximately equal.

Similarly, the second separator 18 has an outer diameter which is approximately of the same size as the diameter of the skirt 12b. The knob 12 makes contact only with the edge of the first separator 14, further aiding in preventing heat from flowing and radiating to the knob 12. Therefore, the knob 12 is capable of being grasped even after a pot has been at an elevated temperature for some time. The metallic knob 12 is more suitable for maintaining hygienic conditions, since it can be washed more thoroughly with strongly acting chemicals and kitchen scrubbing materials and implements. When the parts are tightly assembled together, a watertight seal is created between the knob 12 and the bezel 16, as well as between the bezel 16 and the lid 20 via second separator 18, thereby preventing liquids from penetrating within the interior spaces of the knob assembly 10.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A knob assembly for use with hot cooking utensils, comprising:
    a hand graspable metallic knob;
    a metallic bezel having a predetermined area size for the knob;
    a first heat insulating separator located between the knob and the bezel; and
    a second heat insulating separator located between the bezel and a cooking utensil to which the knob assembly is to be attached, the second heat insulating separator having a solid, non-open body and having an area size substantially equal to said predetermined area size of the metallic bezel.

2. The knob assembly of claim 1, wherein the first and second separator is disk-shaped.

3. The knob assembly of claim 2, wherein the first separator includes a ledge on which the knob rests without contacting either the bezel or the cooking utensil.

4. The knob assembly of claim 2, wherein the bezel defines a well dimensioned to fittingly receive the first separator.

5. The knob assembly of claim 2, wherein only the knob and a peripheral region of the bezel are visible when the knob assembly is attached to a cooking utensil.

6. The knob assembly of claim 2, wherein the first and second separators are constructed of a heat conduction retarding and heat radiation retarding synthetic material.

7. The knob assembly of claim 6, wherein the material is nylon.

8. The knob assembly of claim 2, wherein each of the bezel and the first and second separators includes a respective hole for the passage therethrough of a screw for coupling the screw with the knob.

9. The knob assembly of claim 2, wherein the knob has an outer surface that is bright colored.

10. The knob assembly of claim 2, wherein the knob is shaped as an inverted cup including a base and a skirt-shaped body, the base has a larger diametrical size than the skirt-shaped body of the knob.

11. The knob assembly of claim 2, further comprising a pot lid.

12. The knob assembly of claim 11, further including a bolt of the pot lid and at least one hole in the first and second separators and in the bezel for the bolt to reach the knob and to be fastened thereto.

13. The knob assembly of claim 1, wherein the bezel has the predetermined area size larger than a corresponding area size of the knob.

14. The knob assembly of claim 1, further including a screw assembly for interlocking the knob, the bezel and the first and second separators.

15. The knob assembly of claim 1, wherein the knob, the bezel, and the first and second separators have circular peripheral shapes.

* * * * *